9720X
J. H. Willard,
Fracture Apparatus,
Patented June 11, 1836.
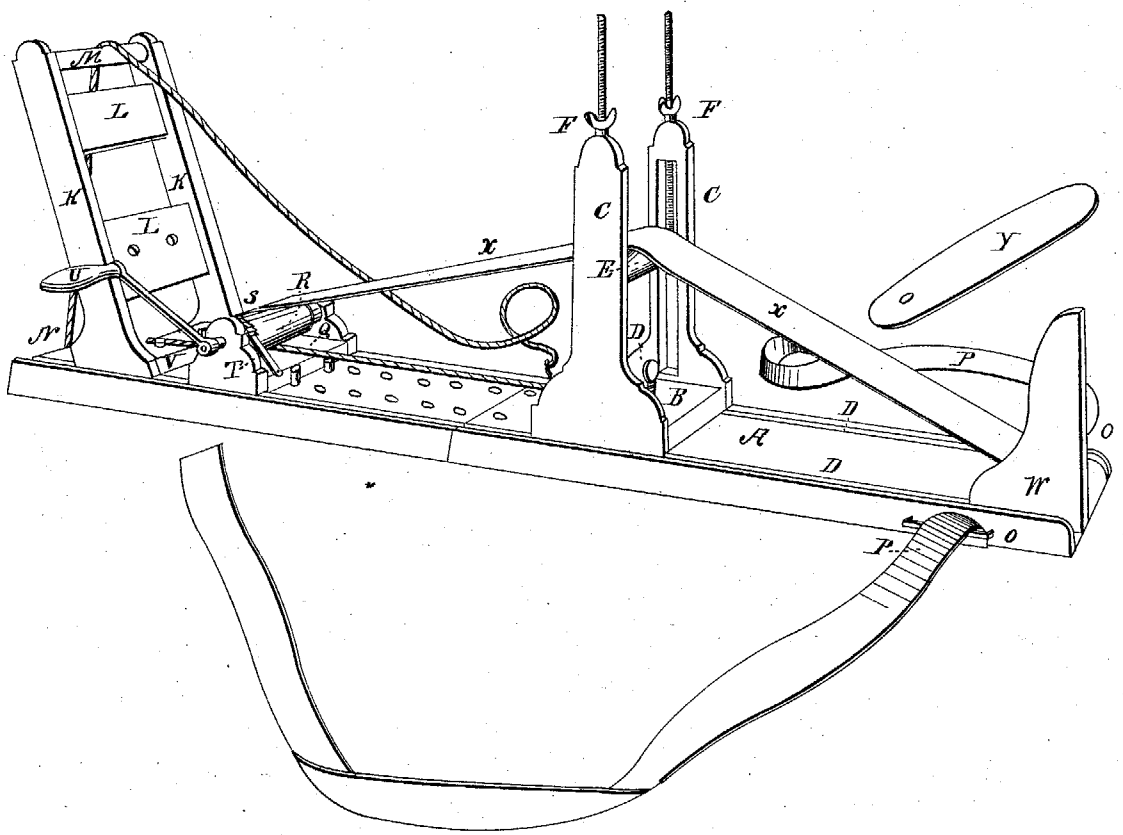
A.M. PHOTO-LITHO. CO. N.Y. (OSBORNE'S PROCESS.)

James H. Willard
Letters Patent

The Schedule referred to in these Letters Patent and making
part of the same containing a description in the words of the said James
H. Willard himself of his improvement in the apparatus
for setting the bones of fractured limbs.
Be it known that I
James H. Willard of Brownhelm in the County of Lorain
and State of Ohio have invented a new and useful improvement
being an apparatus for setting the bones of fractured limbs which
invention is described as follows reference being had to the ac-
companying draught. Said apparatus consists of a board A
of suitable length and breadth having two grooves D. D. run-
ning the entire length of the board A for the reception of slides and
a joint near the centre. No 1. A slide B. with two erect
standards C. C. having a groove in each through which pass
long metallic screws attached at their lower extremi-
ty to a cross bar E. with thumb nuts F. F. resting upon the up-
per extremity of the grooved piece C. C. at the bottom of slide B.
is a thumb screw D. 2nd A slide Q. with a roller R a rag
wheel S. a dog T and a crank U. 3d a slide V. with two
oblique standards K K. two flat cross bars L. L. the lower one
having two perforations and there is a roller M. at the top of the
standards K. K. 4th a slide W. called a crutch. At the
upper end of board A and on the under side is attached a broad
strip of webbin X. which passes over the cross bar E in the slide
B. and is attached to the roller R. in slide Q. At the lower
extremity of A is a pulley N. At the upper end of the board
on both sides are two staples O. O. through which passes a strap
P. Y. thin broad splint. In the application of this appara-
tus I claim entire new grounds. In the first place the grav-
itation of the body is kept from the apparatus thereby prevent-
ing ing the necessity of any counter extending force. In the second
place the flexor and extensor muscles are balanced or antag-
onized by keeping the limb in a flexed or bent position —
In the third place the extension is made directly in the axis
of the broken bones the apparatus commands the whole limb
It supersedes the necessity of tight lacing and prevents all
excoriations from unequal pressure. It admits of the limb
being dressed without a possibility of moving or misplacing
the bones. which makes it of great importance in all com-
pound Fractures. It prevents the contraction of the muscles
and consequent misplacing of the bones. by keeping up a grad-
ual and permanent extension thereby procuring the greatest possi-
ble degree of safety and convenience. The apparatus places the
limb in a situation the most favourable for a free circulation of
air around it in every direction. To apply the apparatus in
case of fractured femur. a bandage called a roller should be
attached to the webbing at its upper extremity. The cross bar T.
in slide B. should be brought by means of the screws to such
a point of elevation as the length of limb requires. The slide
A should then be placed at such a distance from the knee
as to permit the heel to just drop over the roller R. The
webbing should now be made tight. The slide B must be
placed a little short of the length of the sound thigh. The slide
W should be placed in that groove which will correspond
~~with~~ with the inside of the fractured thigh brought down to the
slide B. and there left. The operator will then tie a handker-
chief or fillet above the condiles of the knee, and give the limb
into the hands of an assistant in a flexed position. another assis-
tant will slide the apparatus under the limb and carry and
it up till the upper extremity of the apparatus rests firmly up-
on the tuberosity of the Ischium. The crutch or slide W
should now be brought up in the groin and firmly pressed against
the pubis and secured by the pin. b. the limb should then be placed placed upon the webbing taking care that the hollow of the ham rests directly over the cross bar E. The limb will now be fastened to the cross bar by means of the strap or fillet. such extension should then be made as is necessary to bring the bones in juxta position and the slide B. fastened by the thumb screw. An assistant will now be directed to clasp the limb with both hands and draw the muscles from above downwards as in the manner of dressing a stump after amputation. while the Operator brings the bandage after his hands. till he comes to the knee including the webbing when he should turn the bandage once or twice over the knee and under the cross bar in the form of a figure 8 then apply the splint Y on the top of the thigh and carry his roller back to the starting place Additional extension can be made at discretion by attaching the cord of pulley N. to the projecting extremity of splint Y. and letting it run over the roller M in slide U. What I claim as my invention and which I desire to secure by letters Patent consists in the apparatus for setting and securing the bones of fractured limbs as before specified and described James H. Wellacy Witnesses
Wm P. Elliot
Clement T. Coote 996 wds (Patented 11 June 1836)

Drawing